United States Patent
Huang (10) Patent No.: US 6,435,708 B1
(45) Date of Patent: Aug. 20, 2002

(54) SAFETY PROTECTIVE COVER OF A BLENDER

(75) Inventor: Kun-Chung Huang, Ta-Li (TW)

(73) Assignee: Spar Food Machinery Co., Ltd., Taichung Hsien (TW)

( * ) Notice: Subject to any disclaimer, the term of this patent is extended or adjusted under 35 U.S.C. 154(b) by 0 days.

(21) Appl. No.: 10/072,920

(22) Filed: Feb. 12, 2002

(51) Int. Cl.⁷ .............................. B01F 15/00; A23L 1/00; A47J 43/00; B65D 1/00
(52) U.S. Cl. ........................... 366/347; 99/348; 99/645; 366/129; 366/197; 220/731
(58) Field of Search ......................... 99/348, 341, 492, 99/645; 366/129, 130, 197–204, 344, 347; 220/731, 796, 799; D7/387, 391, 376, 379, 380, 412

(56) References Cited

U.S. PATENT DOCUMENTS

| | | | | |
|---|---|---|---|---|
| 2,193,356 A | * | 3/1940 | Green | 366/347 |
| 2,770,389 A | * | 11/1956 | Drakoff | 99/645 X |
| 4,528,975 A | * | 7/1985 | Wang | 99/645 X |
| 4,900,160 A | * | 2/1990 | Brooks et al. | 366/347 |
| 5,207,506 A | * | 5/1993 | Musseau et al. | 366/347 X |
| 5,306,083 A | * | 4/1994 | Caldwell et al. | 99/348 X |
| 5,472,276 A | * | 12/1995 | Ratermann et al. | 366/347 |
| 5,481,967 A | * | 1/1996 | Chen | 99/645 X |
| 5,556,203 A | * | 9/1996 | Filias | 366/129 X |
| 5,660,469 A | * | 8/1997 | Seguin | 366/347 |
| 5,724,885 A | * | 3/1998 | Uy | 99/341 |
| 5,766,665 A | * | 6/1998 | Miller | 426/565 |
| 5,957,577 A | * | 9/1999 | Dickson et al. | 366/197 |

* cited by examiner

Primary Examiner—Timothy F. Simone
(74) Attorney, Agent, or Firm—Rosenberg, Klein & Lee (57) ABSTRACT

A safety protective cover of a blender. The protective cover is associated with upper edge of a blending container. The bottom of the protective cover at least covers an upper opening of the blending container. The top side of the protective cover is formed with an opening at an axis of the rotary shaft. The opening linearly extends to a circumference of the protective cover to form a split. A water filling hole is formed on the protective cover. At least one latch section is disposed on the bottom of the protective cover for latching the protective cover with upper edge of the blending container.

7 Claims, 8 Drawing Sheets

SAFETY PROTECTIVE COVER OF A BLENDER

BACKGROUND OF THE INVENTION

The present invention is related to a safety protective cover of a blender. The protective cover is transparent and integrally molded. The protective cover is associated with the blending container to achieve a protection effect.

Figure 9:
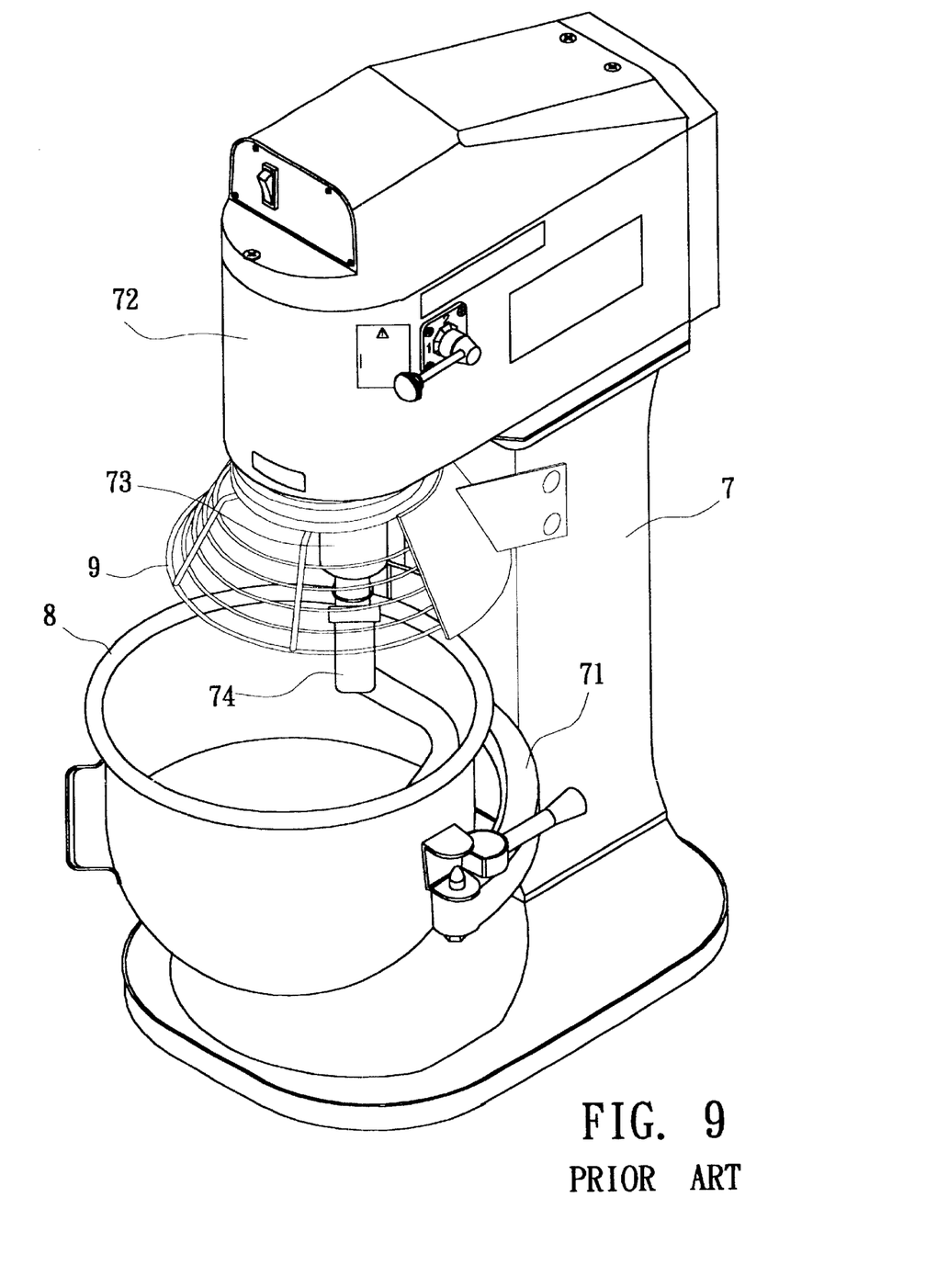
FIG. 9 is a perspective view of a conventional blender.

FIG. 9 shows a conventional food blender used to blend flour mash, etc. The food blender includes a bed 7 having a forward extending substantially semicircular support arm 71. A blending container 8 is placed on the support arm 71. The head section 72 of the blender, which is disposed on upper side of the bed 7 has a rotary shaft 73 right above the blending container. A blending bar 74 is mounted on the rotary shaft for stirring and blending the materials contained in the blending container.

In blending operation, the materials often splash to contaminate the blender and the environment. Moreover, the blender is rotated at very high rotational speed and great torque. This is dangerous to a user.

A protective mesh 9 is mounted on the head section to solve this problem. The protective mesh 9 is conic and positioned around the rotary shaft. When the blending container ascends to make the blending bar extend into the blending container, the protective mesh shields the upper side of the blending container to prevent a user from incautiously touching the blending bar in operation. However, such protective mesh cannot avoid splash of the materials. On the contrary, the protective mesh will be contaminated by the remainders which are hard to be cleared up. Under such circumstance, the user must detach the protective mesh for washing. This is quite inconvenient to a user so that the user often simply wipes the protective mesh without taking off the same. As a result, much dirt will accumulate in the meshes of the protective mesh. It is known that a certain amount of water is often added into the materials to modulate the thickness of the blended materials. A user often directly adds the water through the protective mesh into the blending container during operation. Under such circumstance, the water will entrain the dirt in the protective mesh to contaminate the blended materials.

Furthermore, only when the blending container ascends, the protective mesh can provide a protection function. When the blending container is descended, the protective mesh cannot shield the blending container. Normally the blender should be in an off state when the container is descended. However, when the user's hand extends into the blending container and the blender is mis-activated, the user may still get hurt.

SUMMARY OF THE INVENTION

It is therefore a primary object of the present invention to provide a safety protective cover of a blender. The protective cover is associated with the blending container and can be easily detached therefrom. Only after the blending container is ascended and located, the blender is activated so that the safety in use can be ensured.

It is a further object of the present invention to provide the above safety protective cover which is made by integral molding to lower manufacturing cost. In addition, the protective cover serves to prevent the blended materials from splashing out.

The present invention can be best understood through the following description and accompanying drawings wherein:

DETAILED DESCRIPTION OF THE PREFERRED EMBODIMENT

Please refer to FIGS. 1 to 8. The blender of the present invention includes a bed 10 and a support arm 11 extending from front side of the bed 10. A crank 14 is disposed on a lateral side of the bed for moving the support arm up and down. A U-shaped blending container 20 can be placed on the support arm 11. The top edge of the blending container is formed with a flange 21. A head section 101 of the blender is disposed on upper side of the bed 10. The head section 101 has a rotary shaft 12 right above the blending container. A blending device 5 is mounted on the rotary shaft 12.

Figure 1:
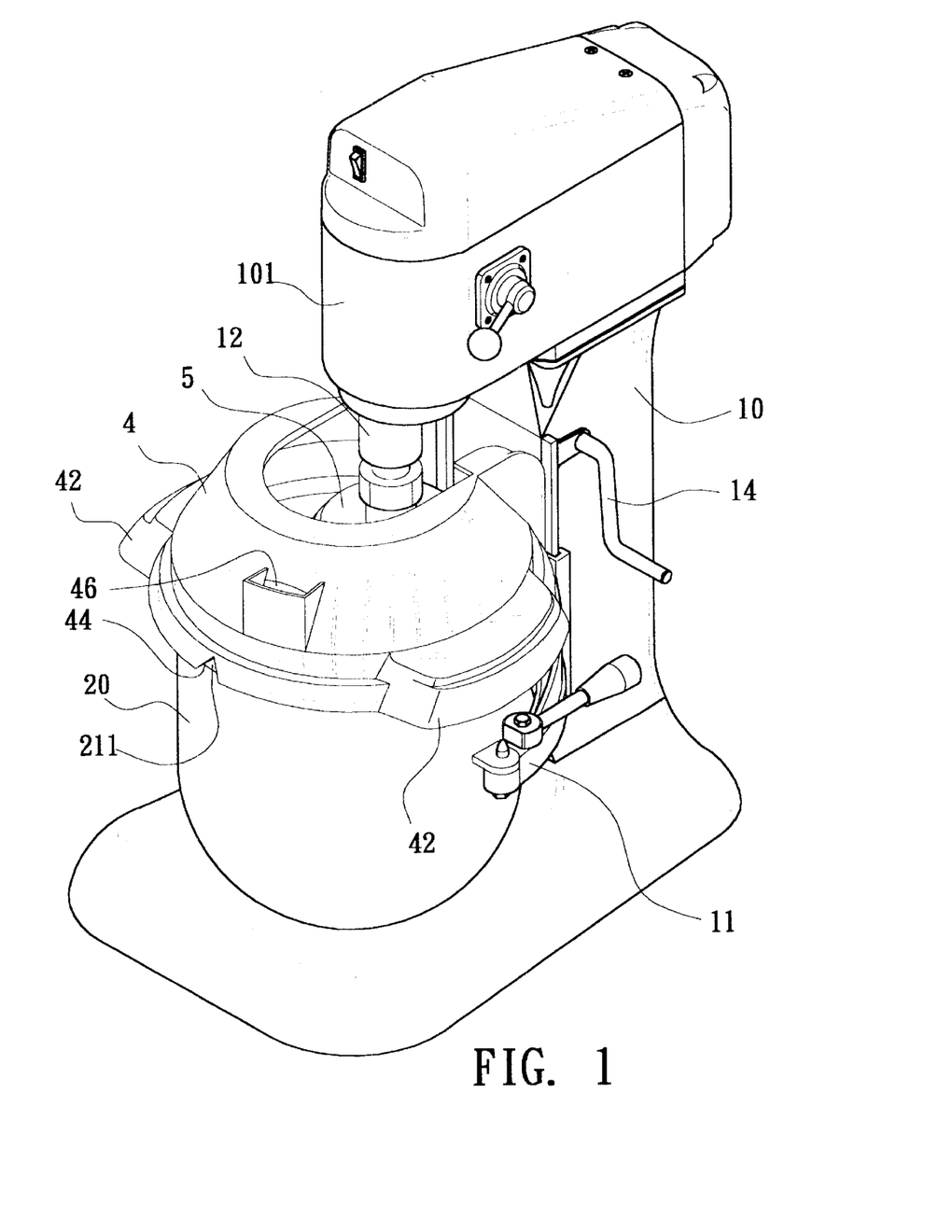
FIG. 1 is a perspective assembled view of the present invention, showing that the protective cover is mounted on the blender.
Figure 2:
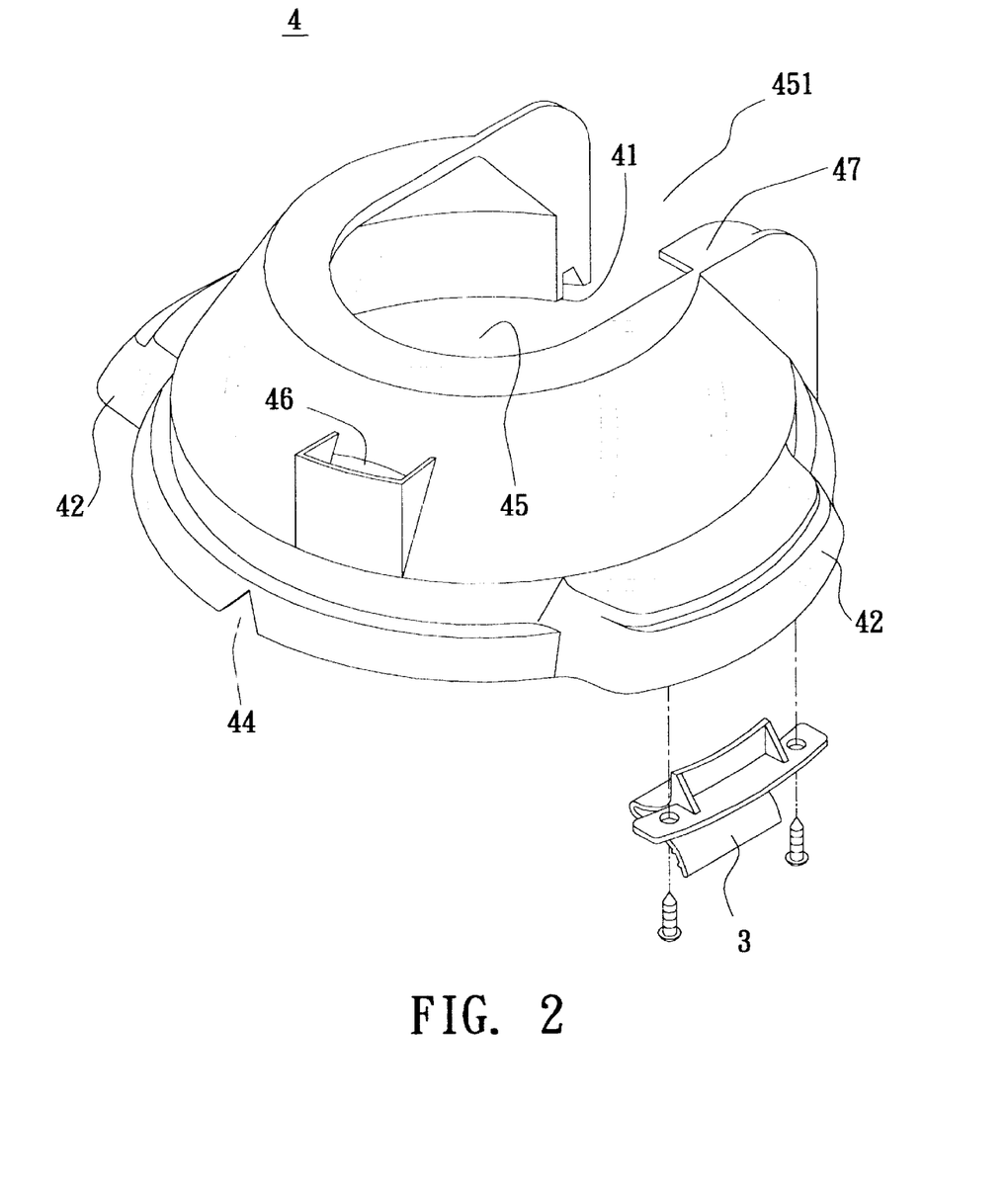
FIG. 2 is a perspective view of the protective cover of the present invention.
Figure 6:
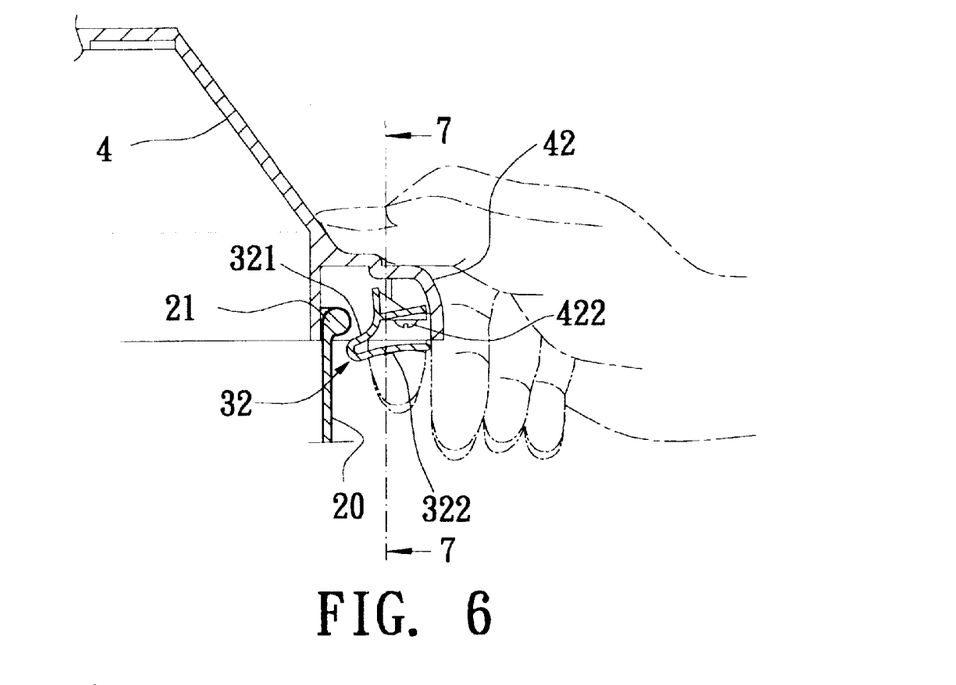
FIG. 6 shows that a user presses the latch member of the protective cover of the present invention.
Figure 7:
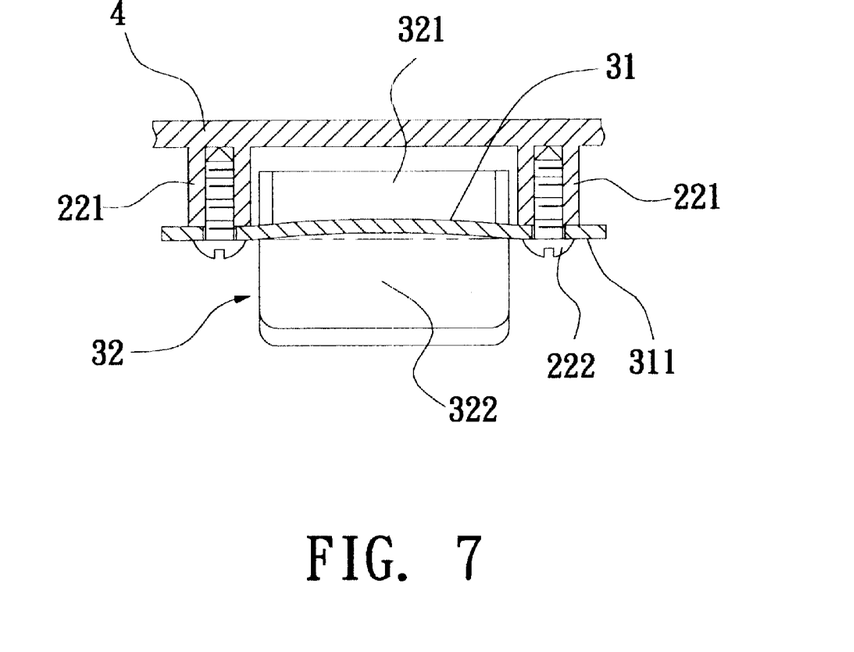
FIG. 7 is a sectional view taken along line 7—7 of FIG. 6.
Figure 8:
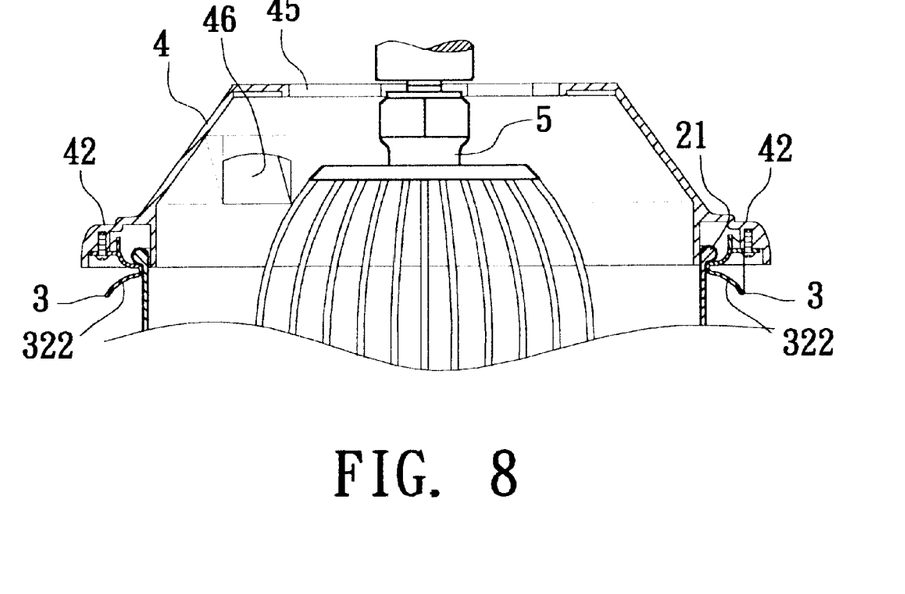
FIG. 8 shows that the protective cover of the present invention is latched with the blending container.

A protective cover 4 is connected with upper edge of the blending container 20. Referring to FIG. 2, the protective cover is integrally made of a transparent material. The bottom of the protective cover at least covers the upper opening 201 of blending container. The bottom side of the circumference of the protective cover abuts against the top side of the flange 21 of the blending container. An annular section 41 protrudes from the bottom of the protective cover and extends along the inner face of the wall of the blending container. Two handle sections 42 transversely protrude from two lateral sides of the bottom of the protective cover. A latch member 3 is disposed under the bottom side of each handle section 42. The latch members 3 are latched with lower side of the flange of the blending container to firmly associate the protective cover with the blending container as shown in FIGS. 6 and 8.

The latch member has a fixing section 31 including two symmetrical lugs 311. Each lug has a fixing hole 312. Two projecting posts 421 are disposed in the handle section corresponding to the lugs for a screw 422 to lock the latch member.

The latch member has a plate-shaped latch hook 32 downward extending between the two lugs. The latch hook is bent toward the center of the protective cover to form a stop section 321 for stopping lower side of the flange of the blending container. The stop section is further reversely bent and extended to form a press section 322 for a user to press.

Figure 5:
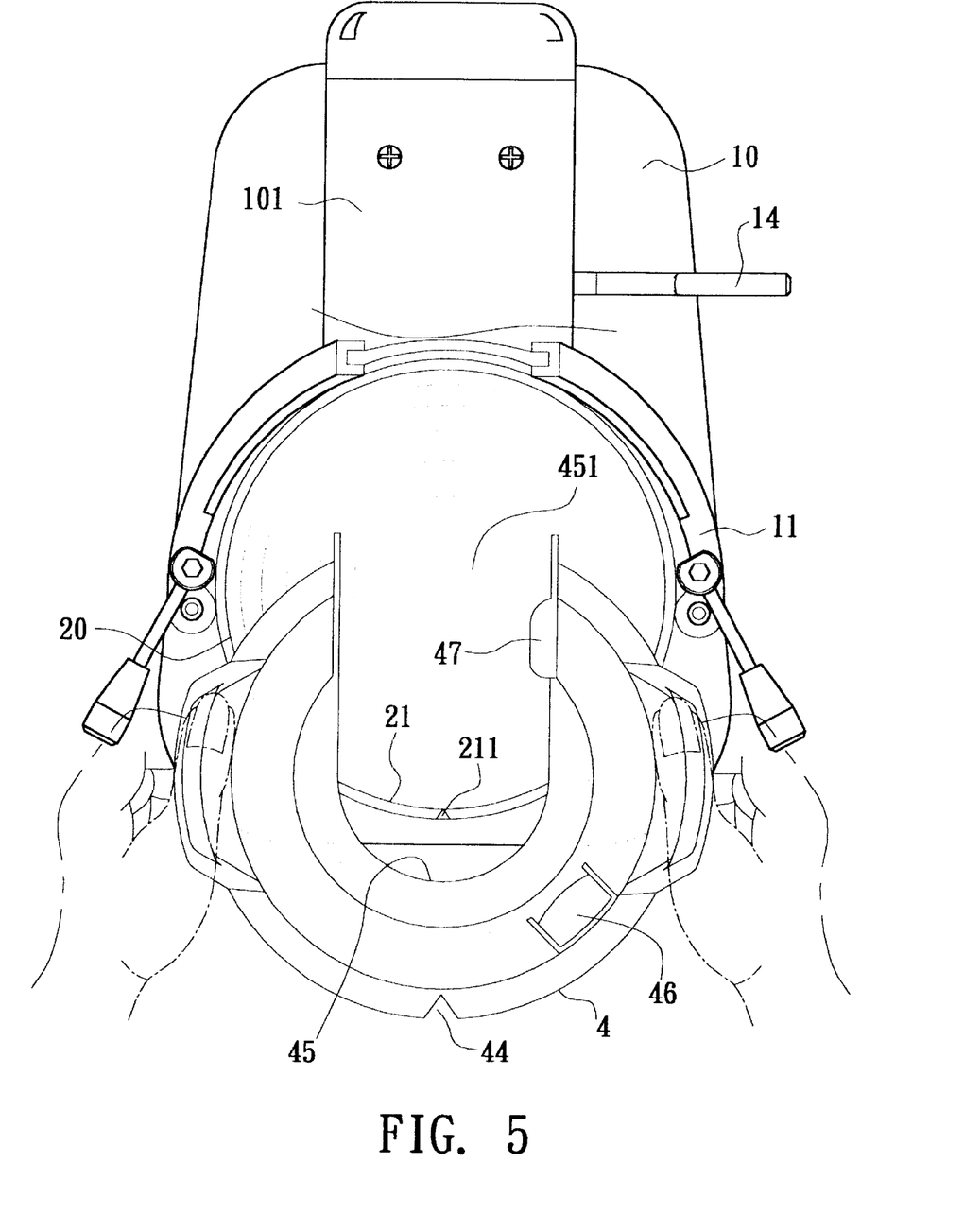
FIG. 5 shows that the protective cover of the present invention is assembled with or disassembled from the blending container.

As shown in FIG. 5, the circumference of the protective cover is formed with a notch 44. The top side of the flange of the blending container is formed with a projecting section 211. The projecting section 211 can be engaged in the notch 44 to locate the protective cover.

The top of the protective cover is formed with an opening 45 at the axis of the rotary shaft 12. The opening 45 linearly extends to the circumference of the protective cover to form a split 451. The width of the opening is at least equal to the diameter of the rotary shaft.

In addition, a through hole 46 is formed on the protective cover, whereby a user can add water through the through hole into the blending container. Moreover, a touch board 47 projects from the protective cover. A switch 13 is disposed on lower side of the head section 101 above the touch board. When the blending container is ascended, referring to FIG. 4, the touch board touches the switch to turn on the blender.

In use, the blender container is placed on the support arm. The protective cover is overlaid on the blending container with the shaft of the blending device passing through the split 451 of the protective cover. Referring to FIGS. 5 to 8, a user respectively presses the press sections 322 of the two latch members with two hands. At this time, the two lugs of the fixing sections of the latch members are locked and the latch hooks 32 are entirely flexed and deformed to downward turn open the stop sections 321. Under such circumstance, when the user releases the press sections of the latch members, the two latch members will resiliently restore to make the stop sections abut against the flange of the blending container. Accordingly, the protective cover is firmly associated with the blending container. By means of engaging the projecting section in the notch of the protective cover, the protective cover is located with the opening aligned with lower side of the head section.

Figure 3:
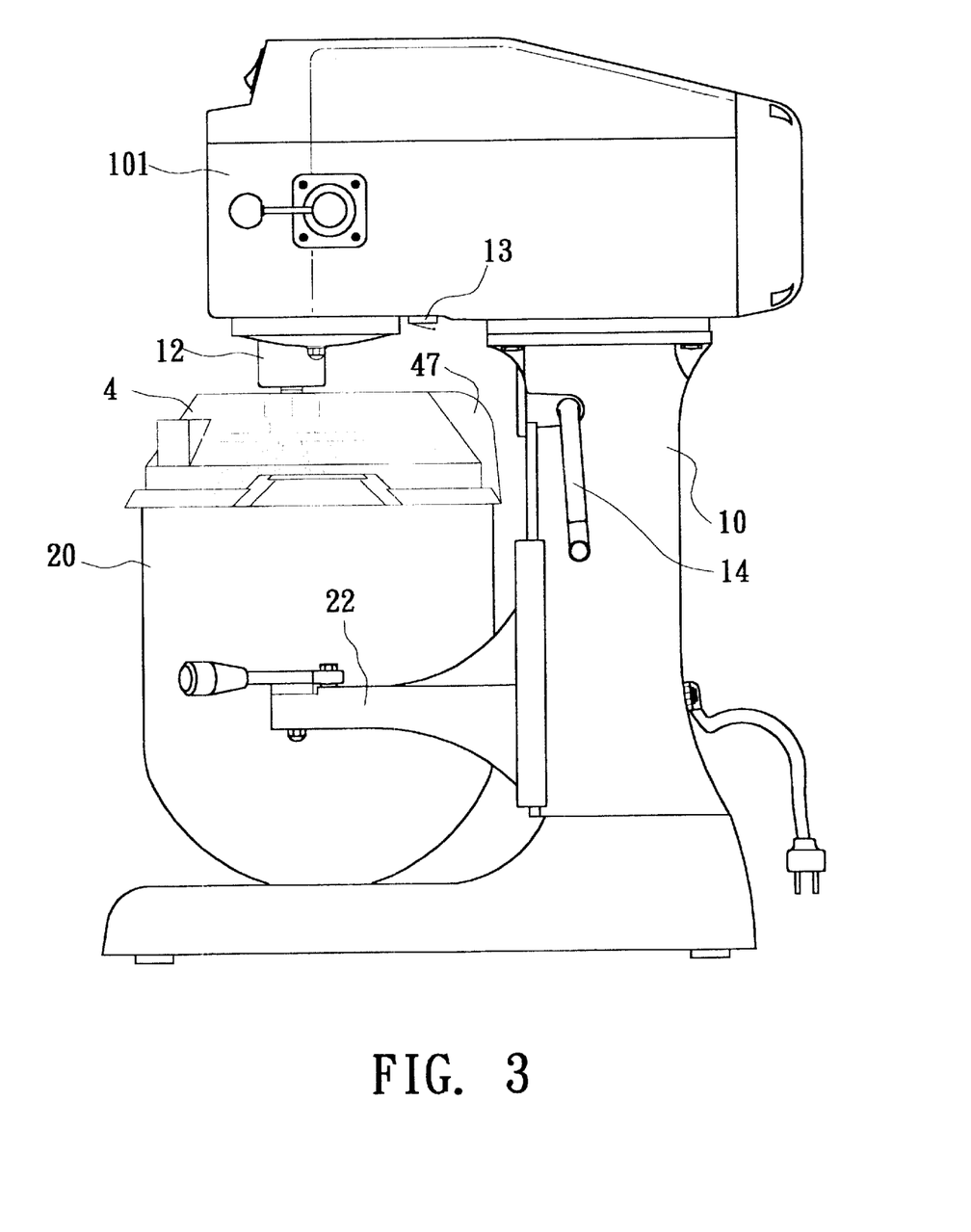
FIG. 3 is a side view showing that the protective cover of the present invention is mounted on the blender.
Figure 4:
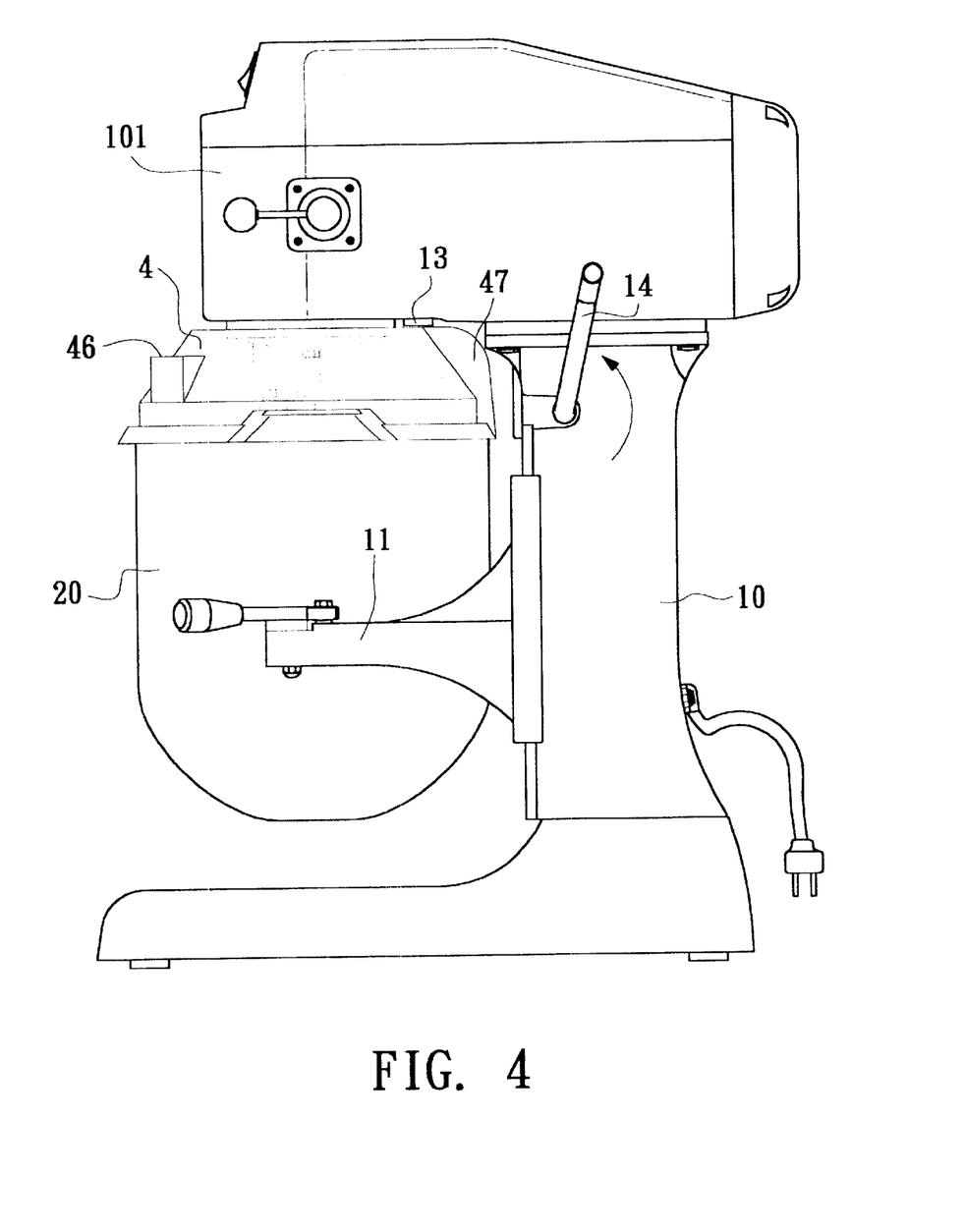
FIG. 4 is a side view according to FIG. 3, showing that the blending container is ascended.

Referring to FIGS. 3 and 4, when a user cranks the crank 14 to lift the support arm, the top side of the protective cover shields the gap between the upper side of the blending container and the head section and touches the switch 13. Therefore, the blending container is ensured to locate in a ready position and in a safe state and then the blender is activated. By means of the protective cover, the blended materials are obstructed from splashing out. The use can directly see the blending state through the protective cover.

The protective cover is simply associated with the blending container by means of hooking the latch members with the flange. Therefore, after the blending operation is finished and it is desired to take off the protective cover for washing, the user only needs to bias the latch members on two sides of the protective cover with two hands to directly taking off the protective cover from the blending container. Accordingly, no other component needs to be detached and it is convenient to take off and wash the protective cover. The protective cover serves to protect a user from incautiously touching the blending bar and getting hurt. Moreover, the manufacturing cost of the protective cover is lower than the conventional protective mesh and the appearance of the protective cover is more beautiful than the protective mesh.

When the support arm is descended, the switch is free from the touch of the touch board. At this time, the blender is turned off and will not be unexpectedly activated due to incaution. All the blending operation is performed only when the protective cover is mounted and the blending container is truly located. Therefore, the safety of the user can be ensured.

The above embodiment is only used to illustrate the present invention, not intended to limit the scope thereof.

Many modifications of the above embodiment can be made without departing from the spirit of the present invention.

What is claimed is:

1. A safety protective cover of a blender, the blender having a bed and a support arm extending from front side of the bed for a blending container to rest thereon, the support arm being up and down movable, a head section of the blender being disposed on upper side of the bed, the head section having a rotary shaft right above the blending container, a blending device being mounted on the rotary shaft, said safety protective cover being characterized in that the protective cover is transparent and integrally molded, the protective cover being associated with upper edge of the blending container, a bottom of the protective cover at least covering an upper opening of the blending container, a top side of the protective cover being formed with an opening at an axis of the rotary shaft, the opening linearly extending to a circumference of the protective cover to form a split, the width of the opening being at least equal to the diameter of the rotary shaft, a through hole being formed on the protective cover, at least one latch section being disposed on the bottom of the protective cover for latching with upper edge of the blending container.

2. The safety protective cover of a blender as claimed in claim 1, wherein a touch board projects from the protective cover and a switch is disposed on lower side of the head section above the touch board.

3. The safety protective cover of a blender as claimed in claim 1, wherein an annular section protrudes from the bottom of the protective cover and extends along the inner face of the wall of the blending container.

4. The safety protective cover of a blender as claimed in claim 1, wherein the top edge of the blending container is formed with a flange against which the bottom side of the circumference of the protective cover abuts, the circumference of the protective cover being formed with a notch, the top side of the flange of the blending container being formed with a projecting section, the projecting section being engaged in the notch to locate the protective cover.

5. The safety protective cover of a blender as claimed in claim 1, wherein at least one handle section transversely protrudes from the bottom of the protective cover, the latch section being disposed on the bottom side of the handle section, whereby the latch section is latched with lower side of the flange of the blending container.

6. The safety protective cover of a blender as claimed in claim 1 or 5, wherein the latch section is a latch member, the latch member having a fixing section for connecting with the protective cover, the latch member further having a plate-shaped latch hook downward extending from the fixing section, the latch hook being bent toward the center of the protective cover to form a stop section for stopping lower side of the flange of the blending container, the stop section being further reversely bent and extended to form a press section for a user to press.

7. The safety protective cover of a blender as claimed in claim 6, wherein the fixing section of the latch member includes two symmetrical lugs, each lug having a fixing hole, the latch hook being positioned between the two lugs, two projecting posts being disposed in the handle section of the protective cover corresponding to the lugs for a screw to lock the latch member.

* * * * *